Aug. 12, 1969

S. H. FORD 3,460,373

SELF-COOLING MOISTURE INDICATOR FOR GASES

Filed March 17, 1967

INVENTOR
STEPHEN H. FORD

BY

Robert J. Rotella AGENT

J. E. Hodges
ATTORNEY

INVENTOR
STEPHEN H. FORD

United States Patent Office 3,460,373
Patented Aug. 12, 1969

3,460,373
SELF-COOLING MOISTURE INDICATOR FOR GASES
Stephen H. Ford, Annapolis, Md., assignor to the United States of America as represented by the Secretary of the Navy
Filed Mar. 17, 1967, Ser. No. 624,101
Int. Cl. G01n 25/02
U.S. Cl. 73—17                                    7 Claims

ABSTRACT OF THE DISCLOSURE

Sample gas to be tested for moisture is pressurized and passed through a steady flow regenerative heat exchanger coil to the inlet of a vortex tube which lowers the temperature of the gas which is used to cool down a visible polished metal mirror mounted within the sampling chamber. Moisture contained in the sample gas introduced into the chamber precipitates on the mirror provided the dew point has been reached. The temperature at which condensation occurs is determined by means of a millivolt meter and thermocouple combination attached to the mirror. Further cooling of the mirror is effected by passing the gas through a storage regenerative heat exchanger coil in proximity to the cold outlet of the vortex tube.

---

The invention described herein may be manufactured and used by or for the Government of the United States of America for governmental purposes without the payment of any royalties thereon or therefor.

This invention relates to measuring instruments and more particularly to an instrument for measuring the moisture content of gases.

It is well known that the dew point of a gas is an indication of its dryness. In many industries, and in laboratories as well, it is of importance to determine the dryness of gases. Various instruments have heretofore been proposed for this purpose. Particularly with dry gases at low pressure applications each of the prior art instruments have suffered from certain disadvantages. Dew cups have been extensively used to measure dew point. Dew cups, however, are difficult to read for dry gases and have considerable error due to temperature lag. Furthermore, dew cup type instruments often require separate refrigeration or cooling sources adding expense and bulk to the system.

Other instruments are not direct reading at certain pressures; they must be used at reduced pressure and the results must be corrected by use of calibration tables. A further disadvantage of many prior devices is that the vapor or dew at the dew point must be detected with the naked eye of the observer and temperature readings must be taken simultaneously, thus introducing the possibility of large human error in the readings which are often rather critical.

An object of this invention is, therefore, the provision of a dew point indicating instrument which lacks the disadvantages of prior art dew point indicating devices.

A further object is to provide an instrument for quickly and simply measuring the dew point of low pressure gases without the necessity of correction or conversion tables.

Figure 1:
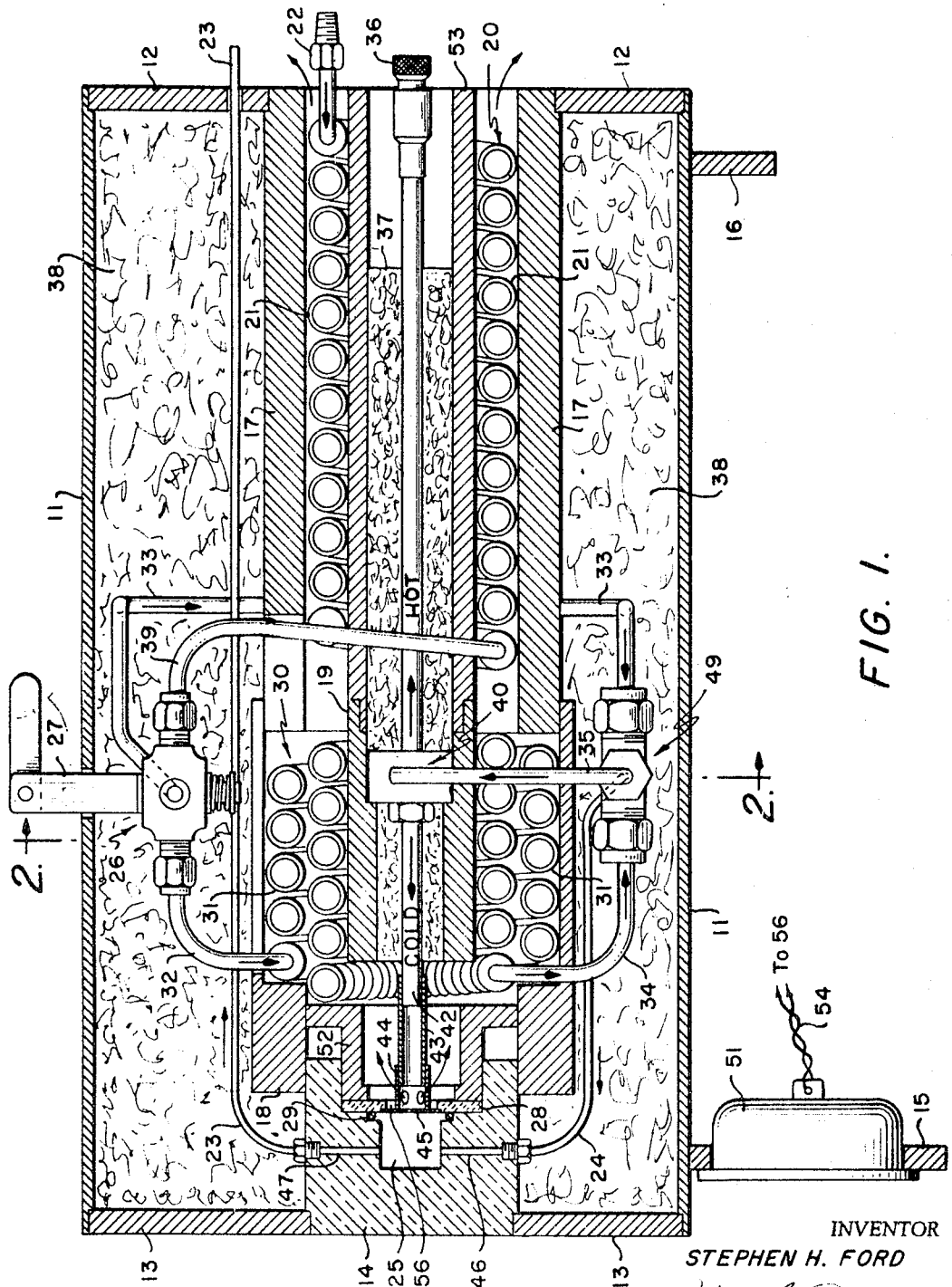
Figure 2:
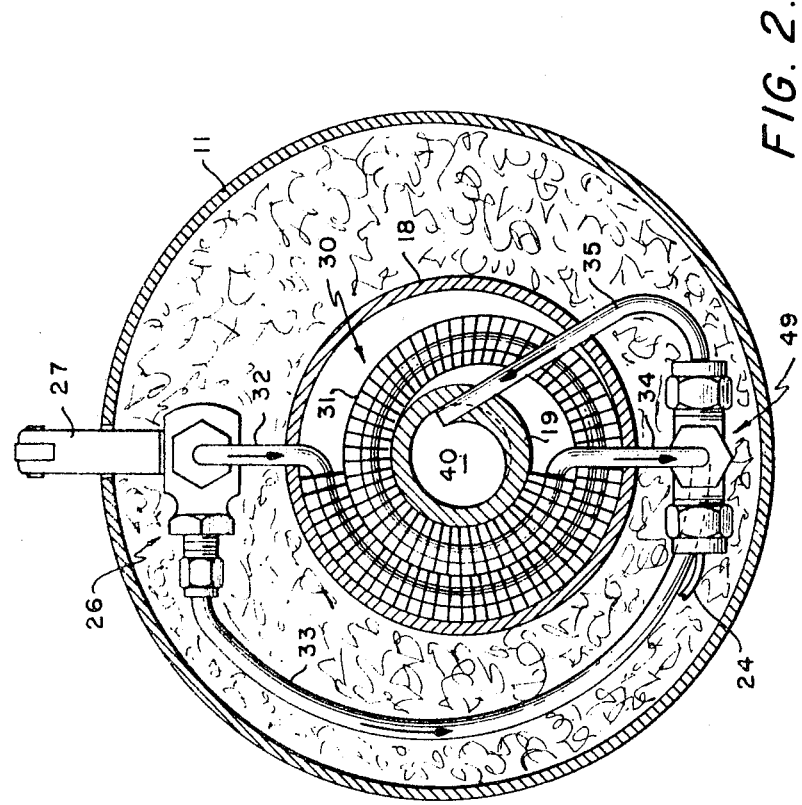

Other objects and many of the attendant advantages of this invention will be readily appreciated as the same becomes better understood by reference to the following detailed description when considered in connection with the accompanying drawings wherein:

FIG. 1 is a sectional view, partly in elevation, of the moisture indicator for gases constructed in accordance with the principles of the invention; and FIG. 2 is a sectional view, partly in elevation, taken along line 2—2 of FIG. 1 and in the indicated direction.

Referring now to the drawings, wherein like reference characters designate like or corresponding parts, there is shown in FIG. 1 an enclosure 11 having a generally cylindrical configuration having a front panel 13 and rear panel 12 preferably constructed of rigid material such as metal. Front panel 13 is provided with a generally circular opening to accommodate a transparent sight glass 14 which has a hollowed-out portion forming a cylindrical sampling chamber 25.

Mounted within sampling chamber 25 is a mirror 45 which fits into a groove provided in an annular insulating member 28. An O-ring 29 seals the member 28 to the sight glass 14. Mirror 45 is preferably formed of either stainless steel or chrome-plated copper while member 28 is fabricated from micarta. A cylindrical nut member 52 engages sight glass 14 and is tightened against insulating member 28.

Abutting mirror 45 is an intensifier tube 44 of copper having a plurality of orifices formed at the end closest to the mirror. The intensifier tube is connected by means of a plastic tube 43 to the cold gas outlet leg 42 of a vortex tube 40, the operation of which is to be described hereinafter.

The vortex tube 40 has an inlet leg 35 and a hot gas outlet 36 which extends oppositely from the cold gas outlet 42 to the rear panel 12. The vortex tube outlets 36 and 42 are wrapped in insulating material 37 such as styrofoam. Surrounding the insulating material is the inner section of the regenerative heat exchanger having a generally cylindrical configuration comprising a front section 19 joined to a rear section 53.

The regenerative heat exchanger further comprises a storage coil 30 consisting of finned metal tubing 31 having a plurality of turns surrounding the front inner section 19. The steady-flow coil 20 consists similarly of a plurality of turns of finned metal tubing 21 disposed about the rear inner section 17. Surrounding coil 30 is a front outer shell 18 while a rear outer shell 17 surrounds coil 20. The space between the outer shells of the heat exchanger and the enclosure 11 is filled with insulating material 38 such as styrofoam.

The end of the steady flow coil 20 adjacent the rear panel 12 is provided with a connector 22 for admitting sample gas to be measured while the opposite end of the coil is connected through tube 39 to the inlet of a three-way valve 26. One outlet of valve 26 is connected through tube 32 to the end of the storage coil 30 nearest front panel 13.

The outlet of storage coil 30 is connected by means of a tube 34 to a four-way pipe cross 49. Cross 49 is also connected to the three-way valve 26 through a tube 33 and to the inlet 35 of the vortex tube 35. In addition a tube 24 connects cross 49 to the interior of the sampling chamber 25 through an inlet channel 46 formed in sight glass 14. An exit channel 47 is also provided and connects the sampling chamber 25 to the external environment through tube 23 brought out through rear panel 12.

The whole apparatus may be suitably mounted and supported by means of front and rear supports 15, 16 affixed to enclosure 11. Furthermore a front support may be suitably fashioned to accommodate a millivolt meter 51 calibrated in units of temperature and connected by means of a pair of leads 54 to a suitable thermocouple 56 which may be affixed to the rear surface of mirror 45 for measuring the temperature thereof.

In operation, the apparatus is connected to a source of sample gas to be tested for moisture through connector 22. The source should preferably supply the gas at a pressure of from 80–150 p.s.i. The handle 27 of three-way valve 26 is turned so that the inlet gas flows through the steady flow coil 20, tubes 39 and 33 to cross 49 and then to the inlet 35 of the vortex tube 40.

Tube 40, more properly known as a Ranque-Hilsch vortex tube has been described (e.g. U.S. Patent No. 1,952,281) and is commercially available. By way of example only, the vortex tubes manufactured by Fulton Cryogenics, Cincinnati, Ohio, may be advantageously employed in this invention. The vortex tube has the property of resolving compressed gas into hot and cold components.

As shown more clearly in FIG. 2, the inlet 35 of vortex tube 40 is tangentially oriented with respect to the interior of the tube. Thus, incoming gas is given a spinning cyclonic motion having extremely high velocity and turbulence. The center of the cyclone or vortex is cold gas which results from the drop in pressure from the compressed source to atmospheric pressure. This cold gas flows through the cold gas outlet 42. The remaining gas flows through the hot gas outlet 36 and due to its turbulent rotational movement rubs the inner surface of the tube and becomes hot. By way of example, such a vortex tube can cool a fraction of gas 100° F. while simultaneously heating the other fraction by 30° F. if adjusted so that 25% of the incoming gas exits through the cold end.

Cold gas from vortex tube 40 will flow through tube 43 and through the orifices formed in the intensifier tube 44 and strike the surface of mirror 45 thereby cooling it. Within a few minutes the mirror will cool down to approximately the temperature of the gas from the vortex tube cold outlet 42. This gas exits the apparatus by flowing through the interstices formed between the inner and outer shells 17, 18, 19, 53 of the heat exchanger and the coils 20, 30. The finned metal tubing 21 of coil 20 allows the incoming gas sample to be further cooled by the action of the exiting gas. The sample gas which is to be tested enters the sampling chamber 25 through the inlet channel 46 by means of tube 24 connected to cross 49. The sample gas strikes the cooled mirror 45 and moisture precipitates on the surface thereof if it has been sufficiently cooled. By noting the inception of condensate formation on the mirror through the transparent sight glass 14 and noting the corresponding temperature indicated on the thermocouple meter 51 the dew-point of the sample gas may be determined directly.

In some instances, the sample gas may have such a low moisture content that the temperature to which mirror 45 is cooled, as described above, may be insufficient to cause condensation. Accordingly, the three-way valve 26 is turned so that after leaving the steady-flow coil 20 the gas will enter the storage coil 30 through tube 32. Since the apparatus had been in operation in order to perform the previous test, the cold gas outlet 42 of the vortex tube 40 is quite cold. Consequently, as the gas passes through the storage coil 30 it becomes further chilled since the final turn of the coil is not insulated from the cold outlet 42. After passing through coil 30 the gas is fed through tube 34 to the cross 49 and then to the inlet 35 of the vortex tube 40. The vortex tube resolves the input gas into hot and cold components as before, except that the cold component has a significantly lower temperature. Thus mirror 45 is cooled to a lower temperature, so that precipitation of gas within the sampling chamber will ensue at the dew point.

In one successful embodiment of the invention, air at a pressure of 100 p.s.i. and a temperature of 70° F. was introduced for testing. With the steady flow coil acting alone, the mirror was cooled to a temperature of −32° F. within five minutes. With the storage coil activated, in addition, the mirror was further cooled to −60° F. in an additional minute.

The invention may be further adapted to conduct measurements on gas samples other than the gas supplied to the vortex tube-heat exchanger system for refrigeration purposes. In such a case the gas is introduced into the sampling chamber 25 directly through tube 24. As a further modification, if the sample gas is at such a low pressure that it will not enter the sampling chamber in sufficient quantities, the gas flowing from the hot outlet 36 of the vortex tube 40 may be used together with an eductor or venturi to suck gas into the chamber by creating a vacuum in tube 23. In addition, the invention may be modified to test gases at extremely high pressure (up to 10,000 p.s.i.) by designing the sampling chamber suitably. The high pressure gas may be dropped in pressure (80–150 p.s.i.) to supply the refrigeration effect through the vortex tube.

Having described the invention, it will be apparent that many modifications will be obvious to one skilled in the art and, consequently, the scope of the invention is to be measured solely by the following claims.

What is claimed is:

1. A self-cooling moisture indicator for gases comprising:

first and second regenerative heat exchanger means each having an inlet for accepting gas to be tested for moisture and an outlet;

vortex tube means having an inlet and hot gas and cold gas outlets;

said vortex tube inlet being connected to the outlet of said first regenerative heat exchanger means;

a sampling chamber for containing precipitation surface means in substantially sealed relationship with regard to the external environment and for permitting viewing of said precipitation surface means;

said vortex tube cold gas outlet being coupled to said precipitation surface means external to said sampling chamber for thereby obtaining cooling of said surface means by the impingement of said cold gas thereon;

a portion of said vortex tube inlet gas being introduced into said sampling chamber;

whereby moisture contained in said introduced gas will form a condensate on said precipitation surface provided said surface has been cooled to the dew point of said gas;

said cold gas flowing through said first and second regenerative heat exchanger means after impinging and precipitation surface means for precooling gas contained therein;

said second regenerative heat exchanger means being selectively connected between the outlet of said first regenerative heat exchanger means and said vortex tube inlet;

whereby said precipitation surface means will be further cooled by the influence of the previously precooled second regenerative heat exchanger means.

2. A self-cooling moisture indicator for gases as set forth in claim 1 further including:

temperature indicating means for indicating the temperature of said precipitation surface means.

3. A self-cooling moisture indicator for gases as set forth in claim 1 wherein:

said first and second regenerative heat exchanger means each comprises a coil for carrying said gas having a plurality of turns.

4. A self-cooling moisture indicator for gases as set forth in claim 3 wherein:
each of said coils is comprised of finned metal tubing.

5. A self-cooling moisture indicator for gases as set forth in claim 4 wherein:
said precipitation surface means comprises a metal mirror.

6. A self-cooling moisture indicator for gases as set forth in claim 5 wherein:
said sampling chamber means is transparent to allow visual observation of the formation of said condensate on said precipitation surface means.

7. A self-cooling moisture indicator for gases as set forth in claim 6 wherein:
said temperature indicating means comprises a thermocouple affixed to said precipitation surface means connected to a voltmeter.

References Cited

UNITED STATES PATENTS

| | | | |
|---|---|---|---|
| 2,281,418 | 4/1942 | Deaton et al. | 73—51 |
| 2,763,150 | 7/1956 | Bannon | 73—17 |
| 3,152,475 | 10/1964 | Ford et al. | 73—335 |

RICHARD C. QUEISSER, Primary Examiner

VICTOR J. TOTH, Assistant Examiner

U.S. Cl. X.R.

62—5